(12) United States Patent
Berthelot et al.

(10) Patent No.: US 6,778,608 B1
(45) Date of Patent: Aug. 17, 2004

(54) GEOMETRIC TRANSCODING OF A DIGITAL SIGNAL

(75) Inventors: Bertrand Berthelot, Rennes (FR); Félix Henry, Rennes (FR); Eric Majani, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/368,495

(22) Filed: Aug. 5, 1999

(30) Foreign Application Priority Data

Aug. 26, 1998 (FR) .............................................. 98 10734
Dec. 2, 1998 (FR) .............................................. 98 15212

(51) Int. Cl.$^7$ .............................. H04N 7/12; G06K 9/36
(52) U.S. Cl. ............................ 375/240.18; 375/240.19; 382/248
(58) Field of Search ................................. 375/130–377, 375/240.18, 240.19, 240.2, 240.01; 341/51; 382/248, 240, 235, 253, 246, 249, 250

(56) References Cited

U.S. PATENT DOCUMENTS

| | | | | |
|---|---|---|---|---|
| 5,751,865 A | | 5/1998 | Micco et al. ................ | 382/296 |
| 5,892,850 A | * | 4/1999 | Tsuruoka .................... | 382/240 |
| 6,215,422 B1 | * | 4/2001 | Henry et al. ................. | 341/51 |
| 6,298,166 B1 | * | 10/2001 | Ratnakar et al. ............ | 382/248 |
| 6,307,968 B1 | * | 10/2001 | Liguori ....................... | 382/235 |
| 6,546,146 B1 | * | 4/2003 | Hollinger et al. ........... | 382/253 |

OTHER PUBLICATIONS

Shen et al., Block–Based Manipulations on Transform–Compressed Images and Videos, Multimedia Systemsk vol. 6, No. 2, Mar. 1998, pp. 1–26.* de Bo Shen et al., "Block–based Manipulations on Transform–compressed Images and Videos", Multimedia Systems, vol. 6, No. 2, Mar. 1998, pp. 1–26.

B. Smith, "A Survey of Compressed Domain Processing Techniques", Reconnecting Science and Humanities in Digital Libraries, Symposium sponsorise par The University of Kentucky at The British Library, Oct. 1995, pp. 1–8.

"New Algorithms For Processing Images In The Transform–Compressed Domain", S–F Chang, Proceedings of the SPIE, vol. 2501, May 24, 1995, pp. 445–454, XP000610425.

"Subband Coding of Images–Comparison With DCT", J. Lhuillier et al., Signal Processing: Theories and Applications, Grenoble, Sep. 5–8, 1988, vol. 3, Conf. 4, pp. 1645–1648, XP00018364.

"Compressed Domain Processing of JPEG–Encoded Images", B.C. Smith et al., Real Time Imaging, vol. 2, No. 1, Feb. 1, 1996, pp. 3–17, XP00065618.

"Algorithm For Manipulating Compressed images", B.C. Smith et al., IEEE Computer Graphics and Aplications, vol. 13, No. 5, Sep. 1, 1993, pp. 34–42, XP000562744.

* cited by examiner

*Primary Examiner*—Stephen Chin
*Assistant Examiner*—Sam K. Ahn
(74) *Attorney, Agent, or Firm*—Fitzpatrick, Cella, Harper & Scinto

(57) ABSTRACT

A method for the geometric transcoding of a compressed data file containing a digital signal of dimension N coded by means of a coding method including at least one step of spectral breakdown into frequency subbands of the digital signal (S). The method includes the steps of extracting symbols associated with the coefficients of the frequency sub-bands of the digital signal and applying a geometric transformation to the symbols. The method further includes the steps of updating N indicator or indicators representing a normal or reversed order of the symbols respectively in N direction or directions of the digital signal and reconstituting the digital signal coded by reversal of the extracting step.

20 Claims, 10 Drawing Sheets

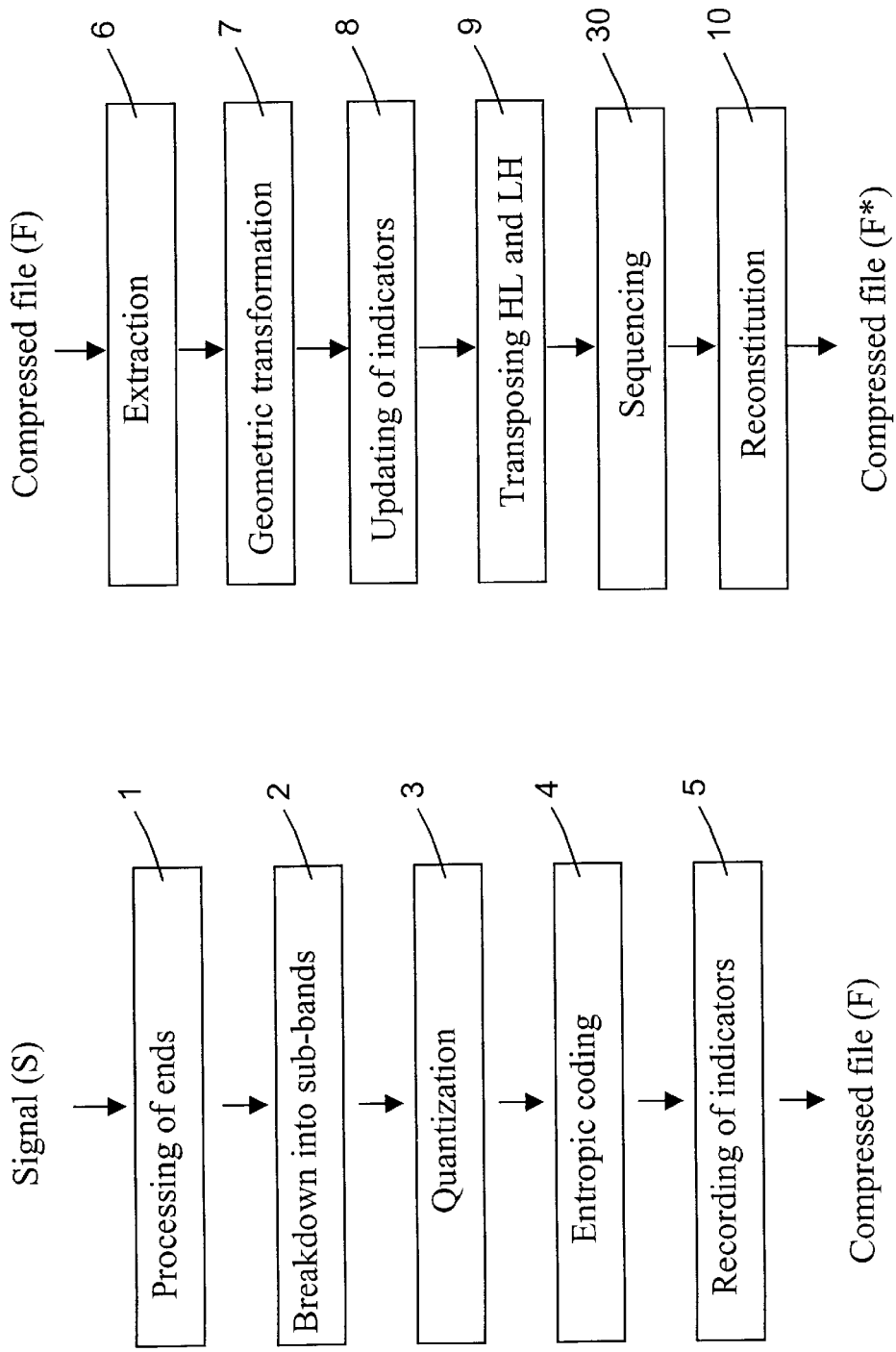

GEOMETRIC TRANSCODING OF A DIGITAL SIGNAL

The present invention concerns a method and a device for the geometric transcoding of a compressed digital signal. It also concerns a coding method and device on the one hand, and a decoding method and device on the other hand, associated with the geometric transcoding method and device.

The technical field of the invention is that of methods for manipulating compressed digital data.

Geometric transcoding is a transformation of one compressed digital data file into another compressed digital data file which, once decoded, represents a digital signal which has undergone a geometric transformation with respect to the initial coded digital signal in the initial compressed data file.

The geometric transformation of a mono- or multi-dimensional digital signal consists of changing the order of the samples of digital signal in one or more directions of the digital signal.

In practice, in the case for example of an image, axial or central symmetry can be produced, or a rotation of the image by manipulating the digital signal representing the image.

It is particularly advantageous to be able to carry out this manipulation and transformation of a coded digital signal without having to compress and then once again compress the file containing the coded digital signal, in order notably to reduce the number of calculations and the memory space necessary for a decompression of the compressed digital data file.

Techniques are known for manipulating digital data in a compressed form, which have been coded by a coding method based on a discrete cosine transform (DCT). Such techniques are described for example in the article "A new family of algorithms for manipulating compressed images" by Brian C. Smith, Lawrence A. Rowe, IEEE Transactions on Computer Graphics and Applications, September, 1993, and in U.S. Pat. No. 5,751,865 (Felice A. Micco, Martin E. Banton).

However, the techniques of compressing a digital signal based on a discrete cosine transform are less efficient in terms of compression than the compression techniques based on a spectral breakdown of the digital signal into frequency sub-bands.

The present information aims to remedy the drawbacks of the prior art by proposing a method and device for transcoding a compressed data file by a compression technique using a spectral breakdown of the digital signal.

To this end, the invention concerns a method for the geometric transcoding of a compressed data file containing a digital signal of dimension N coded by a coding method including at least one step of spectral breakdown into frequency sub-bands of the digital signal.

According to the invention, this transcoding method is characterised in that it includes the following steps:
  extraction of symbols associated with the coefficients of the frequency sub-bands in each direction of the digital signal;
  application of a geometric transformation to said symbols;
  updating of N indicator or indicators representing a normal or reversed order of the symbols respectively in N direction or directions of the digital signal; and
  reconstitution of the coded digital signal by reversal of the extraction step Correlatively, the invention proposes a device for the geometric transcoding of a compressed data file containing a digital signal of dimension N coded by a coding method including at least one step of spectral breakdown into frequency sub-bands of the digital signal, characterised in that it has:
  means of extracting symbols associated with the coefficients of the frequency sub-bands in each direction of the digital signal;
  means of applying a geometric transformation to said symbols;
  means of updating N indicator or indicators representing a normal or reversed order of the symbols respectively in N direction or directions of the digital signal; and
  means of reconstituting the coded digital signal by reversal of the extraction step.

The geometric transcoding method and device make it possible to effect a geometric transformation of a coded digital signal on the basis of a spectral breakdown without completely decompressing the digital signal since the precaution is taken of modifying an indicator intended to give information about the reversal or not of the frequency sub-band symbols, in each direction of the digital signal. This indicator makes it possible to adapt the subsequent decoding method, notably the spectral reconstruction of the digital signal as a function of the value of this indicator.

In addition, this transcoding method avoids making modifications to the value of the symbols associated with the coefficients of the frequency sub-bands of the digital signal, without any increase in the calculation quantity necessary at the time of decoding.

According to one advantageous characteristic of the invention, the extraction step includes a reading of the coded digital signal, the signals being entropic codes associated respectively with the coefficients of the frequency sub-bands obtained by spectral breakdown.

This embodiment is particularly advantageous since it requires a minimal decompression of the compressed data file, the geometric transformation being applied directly to the entropic codes contained in the compressed data file, referred to as prefix codes. It is, however, well suited only when the coding of the digital signal uses an entropic coding, of the Huffman coding type, which associates an entropic coding with each coefficient of the signal of the frequency sub-bands.

According to a preferred version of the invention, which minimises the decompression of the file and is applied for a large number of conventional coding methods, using a scalar quantization of the coefficients of the signal of the sub-bands, the extraction step includes an entropic decoding of the coded digital signal, the symbols being quantization symbols associated respectively with the coefficients of the frequency sub-bands obtained by spectral breakdown.

Alternatively, according to another preferred version, which avoids the complete decompression of the file, and notably the spectral recomposition of the digital signal, the extraction step includes a dequantization of the coded digital signal, the symbols being the dequantized coefficients of the frequency sub-bands obtained by spectral breakdown.

This embodiment is particularly well suited when the coding method uses a vector quantization of the digital signal broken down into frequency sub-bands.

According to a preferred version of the invention, the indicator is a supplementary bit recorded in the compressed data file, having an initial value representing a normal order of the coefficients of the frequency sub-bands in a direction associated with said indicator.

Such an indicator is particularly advantageous in terms of memory space used in the compressed data file. It is also very easily updated from its initial value, fixed for example at the time of coding of the digital signal which has not undergone any geometric transformation, for example by alternation of the values 0 and 1 representing respectively a normal or reversed order of the symbols, for each direction of the digital signal.

In a preferred implementation of the invention, which applies in particular to geometric manipulations of the images, for example, for printing them, the digital signal then being of dimension 2, the geometric transformation applied is a transformation by axial or central symmetry of said symbols, a transformation by rotation through a multiple of 90° or a combination of said transformations.

In this same preferred embodiment of the invention, the transcoding method also comprises a step of transposition of a frequency sub-band having coefficients of low frequency in a first direction of the digital signal and high frequency in a second direction of the digital signal with a frequency sub-band with the same resolution level in the spectral breakdown, having coefficients of high frequency in said first direction and low frequency in said second direction, when the geometric transformation applied comprises a rotation through 90° or 270°.

This characteristic of the transcoding method makes it possible to take into account the changes in direction of the symbols during the rotations through 90° or 270° of an image for example, for a correct application of the method of decoding the digital signal.

According to another preferred version of the invention, the compressed data file containing several digital signals sequenced in a pre-determined order, the transcoding method also includes a step of sequencing the digital signals according to the geometric transformation applied.

The transcoding method thus applies particularly well to a digital signal divided into digital subsignals before being coded, the subsignals being stored in a pre-determined order in the compressed data file.

The invention also concerns a method of decoding a compressed data file containing a digital signal of dimension N coded by a coding method including at least one step of spectral breakdown into frequency sub-bands of the digital signal, characterised in that it comprises, in each direction of the digital signal, the following steps:

reading an indicator representing a normal or reversed state of coefficients of the frequency sub-bands in said direction of the digital signal;

calculating the parity of the digital signal in said direction;

transforming original spectral recomposition filters in said direction as a function of the parity of the digital signal and the value of the indicator; and spectral recomposition of the digital signal by means of transformed recomposition filters.

Correlatively, the invention also concerns a device for decoding a compressed data file containing a digital signal of dimension N coded by a coding method including at least one step of spectral breakdown into frequency sub-bands of the digital signal, characterised in that it has:

means of reading an indicator representing a normal or reversed state of coefficients of the frequency sub-bands in a direction of the digital signal;

means of calculating the parity of the digital signal in said direction;

means of transforming original spectral recomposition filters in said direction as a function of the parity of the digital signal and the value of the indicator; and means of spectral recomposition of the digital signal by means of transformed recomposition filters.

This decoding method and device make it possible to decode a digital signal taking account of any reversal of the coefficients of the signal of the frequency sub-bands for the spectral reconstruction of the digital signal.

The transformation of the reconstruction filters can be effected in a relatively simple fashion, according to the parity of the digital signal and the reversal or not of the coefficient of the signal.

According to an advantageous version of the invention, which uses a relatively simple transformation of the filters, the time of the transformation of the original spectral recomposition filters, these filters are made symetrical and/or offset by an index.

According to a preferred version of the invention, particularly well adapted when the digital signal coding method comprises, in each direction of he signal, a processing of the start and a processing of the end of the digital signal, the decoding method according to the invention also includes the following steps:

calculating the parity of the spectral recomposition filters;

choosing the processing to be applied to said digital signal as a function of the parity of the spectral recomposition filters, the parity of the signal and the value of the indicator; and applying said chosen processing to the digital signal before the spectral recomposition step.

The decoding method thus makes it possible to take into account the edge problems which generally present themselves at the end of a finite monodirectional digital signal. It makes it possible to reverse the processing to be applied to the ends at the time of decoding if the coefficients of the sub-band signal have been reversed.

In an advantageous version of the invention, particularly simple to implement, the digital signal start and end processings are symetrical extensions of the digital signal.

According to a preferred version of the invention, the decoding method also includes a prior step of dividing the compressed data file into several digital signals sequenced in a pre-determined order, the size of said signals being determined according to the value of the indicators.

The decoding method thus takes account also of the change in the order of signals made at the time of transcoding of the signals, so as to re-divide the transcoded digital signal into sub-signals corresponding in size to the sub-signals divided at the time of coding of the digital signal.

The invention also concerns a method of coding a digital signal of dimension N adapted to be transformed geometrically by a transcoding method according to the invention, characterised in that it comprises the following steps;

spectral breakdown into frequency sub-bands of the digital signal; and entry into a compressed file comprising the coded digital signal of N indicator or indicators associated respectively with N direction or directions of the digital signal, in the form of a supplementary bit having an initial value representing a normal order of the coefficients of the frequency sub-bands in a direction associated with said indicator.

Correlatively, the invention concerns a device for coding a digital signal of dimension N adapted to be transformed geometrically by a transcoding method according to the invention, characterised in that it has:

means of spectral breakdown into frequency sub-bands of the digital signal; and means of entry into a compressed file containing the coded digital signal of N indicator or indicators associated respectively with N direction or directions of the digital signal, in the form of a supplementary bit having an initial value representing a normal order of the coefficients of the frequency sub-bands in a direction associated with said indicator.

This coding method and device has the advantage of associating with the digital signal, as from coding, an indicator representating a normal, non-transformed state of the digital signal.

By associating an indicator with each direction of the digital signal, it is then possible, at the time of transcoding, to modify these indicators in order to take account of the transformations of the digital signal, in a compressed form, in all the directions of the space containing the digital signal.

The invention also relates to a digital signal processing apparatus having means adapted to implement the transcoding method, the decoding method or the coding method, or again having a transcoding device, a de-coding device or a coding device as disclosed above.

The transcoding, decoding and coding methods according to the invention are particularly well adapted to be used in a digital photographic apparatus, a computer or a photocopier.

Correlatively, the invention also concerns a computer, a photocopier or a digital photographic apparatus having a transcoding device, a decoding device or a coding device according to the invention.

The transcoding and decoding methods are also particularly well adapted to be used in a digital printer.

Correlatively, the invention also concerns a digital printer comprising a transcoding device or a decoding device according to the invention.

The advantages of the digital signal processing apparatus, the digital photographic apparatus, the computer, the photocopier and the digital printer are similar to those of the methods which they implement or the devices which they include.

An information storage means, which can be read by a computer or a microprocessor, integrated or not into it, possibly removable, stores a program implementing the coding and/or transcoding and/or decoding method.

In this way, the present invention concerns a computer program product loadable into a computer or stored on a computer usable medium comprising software code portions for performing the steps of the coding and/or transcoding and/or decoding method when it runs on a computer.

Other particularities and advantages of the invention will also emerge from the following description of a preferred embodiment of the invention.

In the accompanying drawings, given by way of non-limitative example:

FIG. 1 is a block diagram of a coding device according to one embodiment of the invention;

FIG. 2 is a block diagram of a transcoding device according to one embodiment of the invention;

Figure 3:
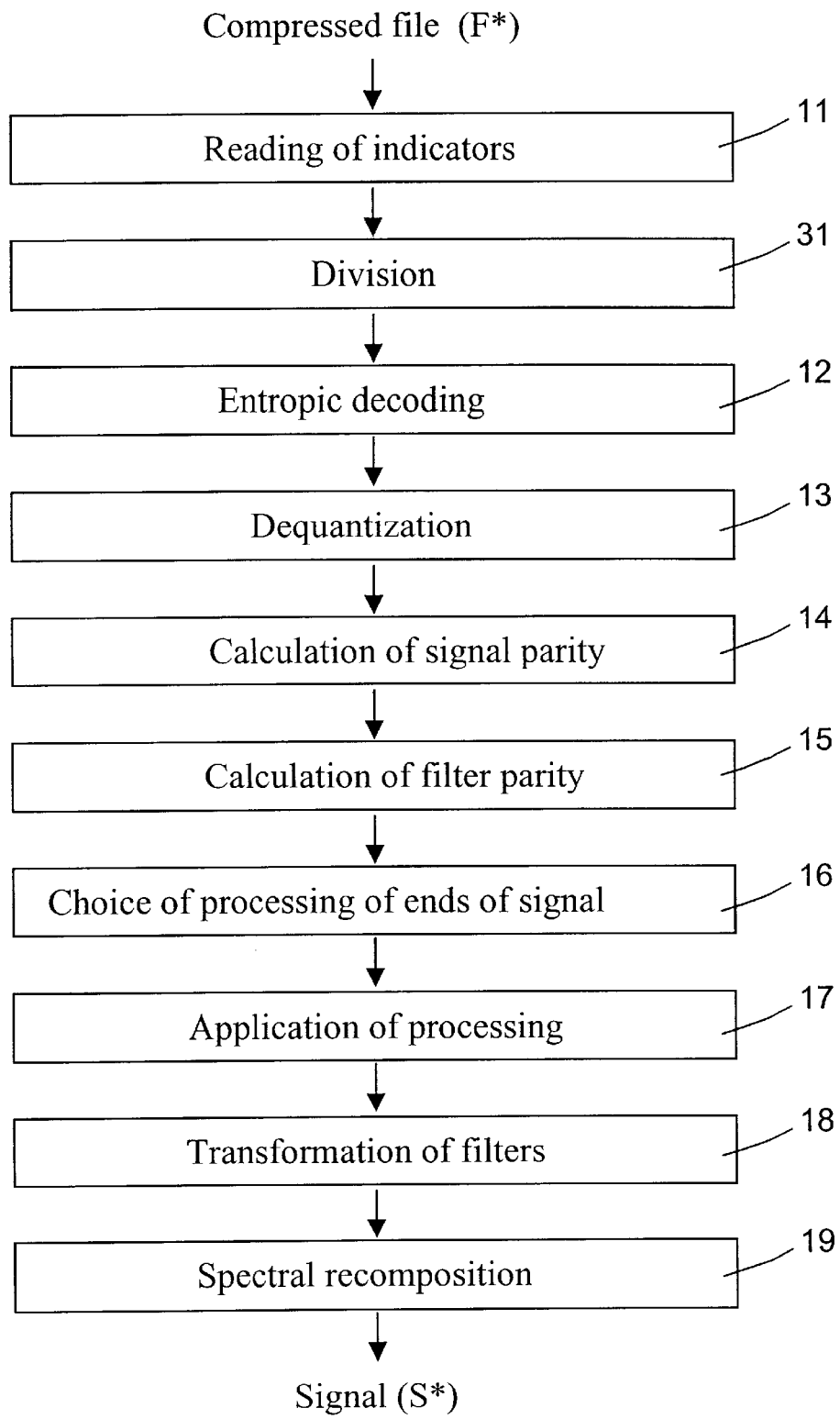
FIG. 3 is a block diagram of a decoding device according to an embodiment of the invention.

A description will first of all be given, with reference to FIG. 1, of a coding device according to one embodiment of the invention intended to code a digital signal S for the purpose of compressing it.

In this particular embodiment, the digital signal S is of dimension 2, formed by a series of digital samples representing an image. The digital samples are for example bytes, each byte value representing a pixel of an image, here with 256 grey levels, or a black and white image.

The signal S is supplied to the coding device in a convention fashion by a signal source which either contains the digital signal and is for example a memory, a hard disk or a CD-ROM, or converts an analogue signal into a digital signal, and is for example an analogue photographic apparatus associated with an analogue to digital convertor.

The coding device has means 2 for the spectral breakdown into frequency sub-bands of the digital signal.

These spectral breakdown means consist of a conventional set of filters, respectively associated with decimators by two, which filter the image in two directions.

As the filtered signal has a support wider than the support of the original signal, the coding device conventionally has processing means 1, upstream of the breakdown means 2, adapted to process the ends of the digital signal in order to avoid the problems related to edge effects.

In this example embodiment, the processing means 1 for the start and end of a digital signal are adapted to produce symetrical extensions of the digital signal. These processing means 1 can be adapted to implement any other equivalent processing, for example, aliasing of the filters.

In the usual fashion, a digital signal of length K, X(0) X(1) X(2) X(3) ... X(K−4) X(K−3) X(K−2) X(K−1) can be extended at its ends by:

an extension whose centre of symmetry is the last sample of the signal (extension P):

X(2) X(1)/X(0) X(1) X(2) X(3) ... X(K−4) X(K−3) X(K−2) X(K−1)/X(K−2) X(K−3) or an extension whose centre of symmetry is the half-sample external to the signal (extension 1/2P):

X(1) X(0)/X(0) X(1) X(2) X(3) ... X(K−4) X(K−3) X(K−2) X(K−1)/X(K−1) X(K−2) or an extension whose centre of symmetry is the last sample of the signal and where the samples external to the signal are multiplied by −1 (extension −P):

−X(2) −X(1)/X(0) X(1) X(2) X(3) ... X(K−4) X(K−3) X(K−2) X(K−1)/−X(K−2) −X(K−3) or an extension whose centre of symmetry is the half-sample external to the signal and where the samples external to the signal are multiplied by −1 (extension −1/2P):

−X(1) −X(0)/X(0) X(1) X(2) X(3) ... X(K−4) X(K−3) X(K−2) X(K−1)/−X(K−1) −X(K−2) or an extension whose centre of symmetry is a zero at the ends of the signal and where the samples external to the signal are multiplied by −1 (extension −1/2P0):

−X(1) −X(0) 0 X(0) X(1) X(2) X(3) ... X(K−4) X(K−3) X(K−2) X(K−1) 0 −X(K−1) −X(K−2)

The type of extension used is identical at the two ends of the digital signal at the time of coding and spectral breakdown thereof. On the other hand, the extension can be different at the time of decoding and spectral recomposition of the signal, according to the parity of the signal and the filter used. This modification of the extension type will be explained in more detail below, in relation to the decoding method according to the invention.

In this example embodiment, the means 1 of processing the ends of the signal are adapted to use an extension P if the length parity of the breakdown filters used is odd and an extension 1/2P if the length parity of the filters is even.

Figure 4:
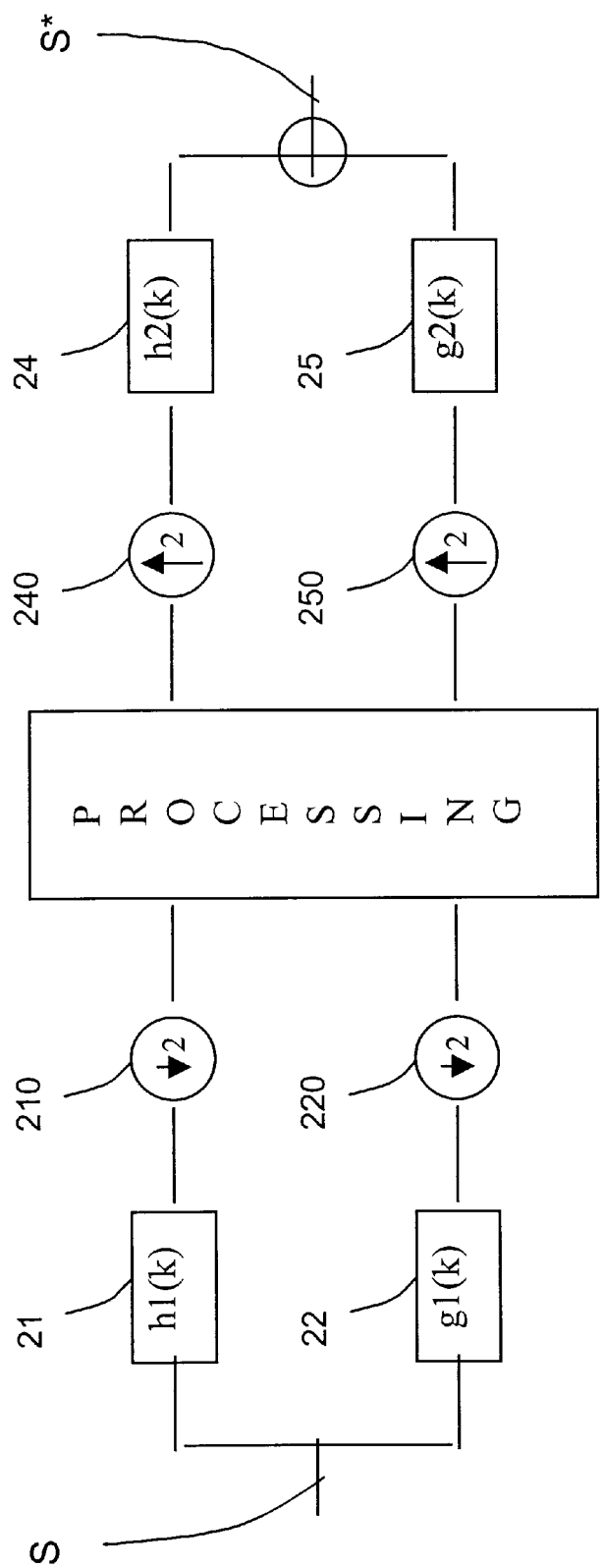
FIG. 4 is a circuit for breaking down into frequency sub-bands and for recomposition, included in the coding and decoding devices illustrated respectively in FIGS. 1 and 3.

Preferably, the spectral breakdown means 2 are adapted to effect a breakdown into discrete wavelets and consist of a circuit for decomposing into sub-bands, or analysis circuit, formed by a set of analysis filters 21, 22, respectively associated with decimators by two 210, 220, (see FIG. 4). This spatial high frequencies and low frequencies.

These low-pass h1(k) and high-pass g1(k) breakdown filters have the same length parity, herein referred to as the parity of the filters.

In this example, only one analysis unit has been depicted. The breakdown circuit does however preferably have several successive analysis units for breaking the signal S down into sub-bands according to several resolution levels.

Figure 6:
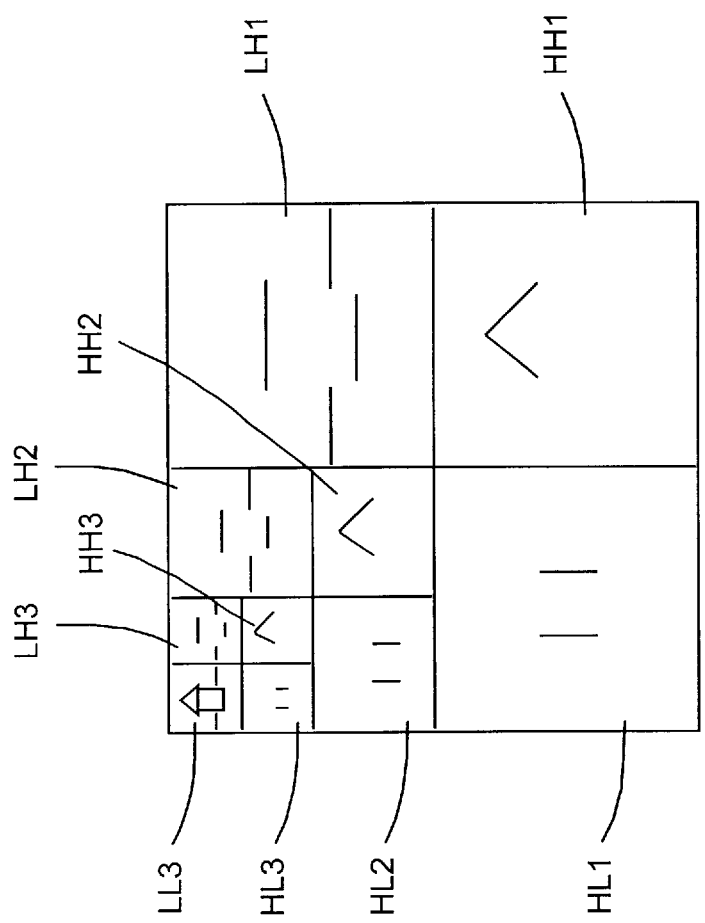
FIGS. 5 and 6 illustrate a spectral breakdown of an image into frequency sub-bands.
Figure 5:
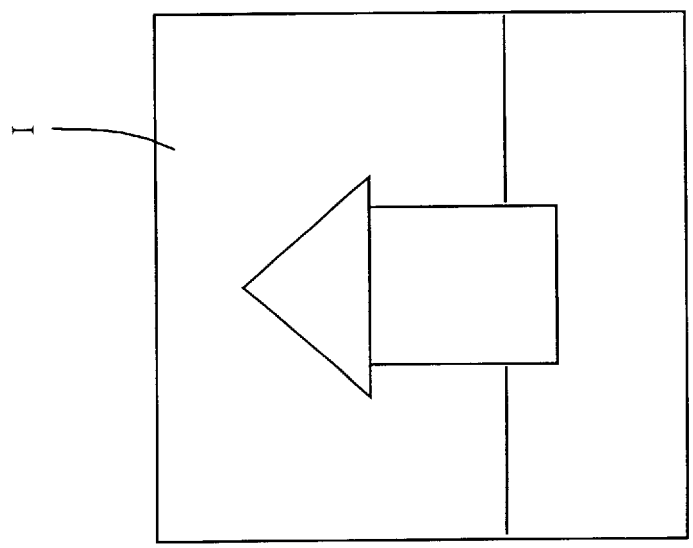

This breakdown into sub-bands is well known and the different analysis steps used will be briefly stated below, with reference to FIGS. 5 and 6, in the case of an image I broken down into sub-bands at a breakdown level equal to 3.

A first analysis unit receives the image signal I and filters it through two digital filters, respectively low-pass and high-pass, in a first direction, for example horizontal. After passing through decimators by two, the resulting filtered signals are in turn filtered by two filters respectively low-pass and high-pass, in a second direction, for example vertical. Each signal is once again passed through a decimator by two. This then gives, at the output of this first analysis unit, four sub-bands $LL_1$, $LH_1$, $HL_1$ and $HH_1$ with the highest resolution in the breakdown.

The sub-band $LL_1$ includes the components of low frequency in the two directions of the image signal I. The sub-band $LH_1$ includes the components of low frequency in a first direction and of high frequency in a second direction of the image signal I. The sub-band $HL_1$ includes the components of high frequency in the first direction and the components of low frequency in the second direction. Finally, the sub-band $HH_1$ includes the components of high frequency in both directions.

A second analysis unit in its turn filters the sub-band $LL_1$ in order to supply, in the same way, four sub-bands $LL_2$, $LH_2$, $HL_2$ and $HH_2$ with an intermediate resolution level in the breakdown. Finally, in this example, the sub-band $LL_2$ is in its turn analysed by a third analysis unit in order to provide four sub-bands $LL_3$, $LH_3$, $HL_3$ and $HH_3$ with the lowest resolution in this breakdown.

Thus ten sub-bands and three resolution levels are obtained. Naturally, the number of resolution levels, and consequently of sub-bands, can be chosen differently, and can for example be equal to four resolution levels with thirteen sub-bands.

In another embodiment, the sub-bands HL, LH and HH can also be broken down into sub-bands of lower resolution.

As illustrated in FIG. 1, the coding device also has quantization means 3 for quantizing, in a conventional fashion, by means of quantization symbols, the coefficients of the signal broken down into frequency sub-bands, and entropic coding means 4 for coding the quantization symbols.

These different means of processing 1, spectral breakdown 2, quantization 3 and entropic coding 4 are in normal use in the field of image comparison and will not be described in any more detail here.

In this preferred embodiment, the quantization means 3 are adapted to perform a scalar quantization of the coefficients of the signal of the sub-bands $LL_3$, $LH_3$, $HL_3$, $HH_3$, $LH_2$, $HL_2$, $HH_2$, $LH_1$, $HL_1$ and $HH_1$. Thus each coefficient $c_i$ of the frequency sub-bands is depicted in a unique fashion by a quantization symbol $q_i$. By way of example, the entropic coding can be an arithmetic coding.

According to the invention, the coding device has means 5 of entering in a file compressed data F containing the coded digital signal of N indicator or indicators associated with each direction of the digital signal, N here being equal to 2.

This indicator is in the form of a supplementary bit having an initial value representing a normal order of the coefficients of the signal of the frequency sub-bands in a direction associated with the indicator.

For an image of dimension 2, two indicators are entered in the compressed file F, the first indicator Ih associated with the horizontal direction and a second indicator Iv associated with the vertical direction of the digital signal S.

The initial value representing the normal order of the sub-band coefficients, that is to say of an image which has not undergone any geometric transformation, can be equal to 0 by way of example.

In this way, there is obtained at the output of the coding device a compressed data file F comprising the digital signal S coded and not transformed geometrically, and the indicators Ih and Iv entered with their initial value 0.

A description will now be given, with reference to FIG. 2, of the transcoding device according to one embodiment of the invention, adapted to transcode a compressed file F by means of the coding device described above.

This geometric transcoding device has:
  means 6 of extracting symbols associated with the coefficients of the frequency sub-bands in each direction of the digital signal;
  means 7 of applying a geometric transformation to the symbols;
  means 8 of updating the indicators Ih and Iv representing a normal or reversed order of the symbols respectively in the two directions of the digital signal; and
  means 10 of reconstituting the coded digital signal transformed geometrically in the compressed file F*.

In this example, and in relation to the embodiment described above of the coding device, the extraction means 6 are adapted to perform an entropic decoding of the coded digital signal, the symbols being quantization symbols $q_i$ associated respectively with the coefficients $c_i$ of the signal of the frequency sub-bands obtained by spectral breakdown.

The means 7 of applying a geometric transformation are for example adapted to perform a transformation of the symbols $q_i$ by axial or central symmetry, a transformation by rotation by a multiple of 90° or a combination of these transformations. They are adapted to update the width and height of the image in the compressed file, the height and width being reversed when the image is pivoted through 90° or 270°.

The decoded image can thus, by way of example, be transformed according to an axial symmetry (vertical or horizontal), be turned over (rotation through 180°) or oriented differently (rotation through 90° or 270°).

The means 8 of updating the indicators Ih and Iv modify the value of this indicator when the transformation applied modifies the order of the symbols in the direction associated with the indicator. The value of the indicator is then equal to 1 when the order of the symbols is reversed with respect to the decomposition.

Table 1 below illustrates, according to the different types of geometric transformation applied, the new values, denoted I'h and I'v, of the indicators Ih and Iv, which replace the old values in the transcoded compressed file.

These new values I'h and I'v are a function of the geometric transformation applied and the old values of the indicators Ih and Iv.

The bit which is the inverse of the bit I is hereinafter denoted inv(I), that is to say inv(I)=1 when I=0 and inv(I)=0 when I=1.

The rotations are indicated in the clockwise direction.

TABLE 1

| Transformation | I'h | I'v |
|---|---|---|
| Identity | Ih | Iv |
| rotation through 90 degrees | inv(Iv) | Ih |
| rotation through 180 degrees | inv(Ih) | inv(Iv) |
| rotation through 270 degrees | Iv | inv(Ih) |
| vertical symmetry axis | inv(Ih) | Iv |
| vertical symmetry axis then rotation through 90 degrees | inv(Iv) | inv(Ih) |
| vertical symmetry axis then rotation through 180 degrees | Ih | inv(Iv) |
| vertical symmetry axis then rotation through 270 degrees | Iv | Ih |

The reconstitution means 10 are in this example entropic coding means adapted to recompress the data file containing the digital signal which was transformed geometrically.

In this example embodiment in dimension 2, the transcoding device also comprises means 9 of transposing the frequency sub-bands $HL_3$ $HL_2$ and $HL_1$ having coefficients $c_i$ of low frequency in the first direction of the digital signal and of high frequency in a second direction of the digital signal with respectively of the frequency sub-bands $LH_3$, $LH_2$ and $LH_1$ with the same resolution level in the spectral breakdown, having coefficients $c_i$ of high frequency in the first direction and low frequency in the second direction. This transposing of the sub-bands is effected when the geometric transformation applied comprises a rotation through 90° or 270° which modifies the direction of the coefficients $c_i$.

In this way there is obtained at the output of the transcoding device a compressed data file F* which is transcoded with respect to the initial compressed data file F so that, on decoding, the decoded digital signal S* will have been transformed geometrically with respect to the initial digital signal S.

A description will now be given of the decoding device according to one embodiment of the invention, with reference to FIG. 3, which makes it possible to decode a compressed data file transcoded by means of the transcoding device described previously.

This decoding device has means 11 of reading an indicator Iv or Ih representing a normal or reversed state of coefficients $c_i$ of the signal of the frequency sub-bands in one direction of the digital signal.

It also has entropic decoding means 12 and dequanization means 13 for decoding and dequantizing the compressed digital signal in a conventional fashion.

According to the invention, it also comprises means 14 of calculating the parity of the digital signal and means 18 of transforming the original spectral recomposition filters as a function of the parity of the digital signal and the value of the indicator.

Means 19 for the spectral recomposition of the digital signal are adapted to reconstruct the signal by means of transformed recomposition filters.

The spectral recomposition means 19 comprise a synthesis circuit which corresponds to the analysis circuit described in the coding device. In a known fashion, and as illustrated in FIG. 4, synthesis filters 24 and 25 are associated respectively with multipliers by two 240 and 250. The synthesis circuit of course has as many synthesis units as the analysis circuit has analysis units. In this example embodiment, the synthesis unit will have three successive synthesis units.

It is known that the conditions for perfect reconstruction of the digital signal entail the parity of the low-pass h2(k) and high-pass g2(k) recomposition filters being identical to that of the breakdown filters h1(k) and g1(k).

In addition, the low-pass breakdown h1(k) and low-pass recomposition h2(k) recomposition filters are symmetrical.

In general terms, the breakdown and recomposition filters verify the following equations, which afford perfect reconstruction of the digital signal S:

$$g1(k)=(-1)^k h2(-k+1)$$

$$\text{and } g2(k)=(-1)^k h1(-k+1)$$

The transformation means 18 of the recomposition filters h2 and g2 are adapted to modify these filters in order to take account of the reversals in the order of the coefficients $c_i$ in the sub-bands.

Table 2 below illustrates the transformation of the initial synthesis filters, which can be interpreted as the construction of new filters h'2 and g'2:

TABLE 2

| Parity of signal to be reconstructed | Ih (ou Iv) | h'2(k) | g'2(k) |
|---|---|---|---|
| Odd | 0 | h2(k) | g2(k) |
| Odd | 1 | h2(-k) | g2(-k) |
| Even | 0 | h2(k) | g2(k) |
| Even | 1 | h2(-k + 1) | g2(-k + 1) |

The transformation means 18 of the original spectral recomposition filters are thus adapted to make the spectral recomposition filters h2(k) and g2(k) symmetrical or to shift them by an index.

The transformation of the filters can, for a simplification of the implementation of the decoding device, also be interpreted as a conservation of the original recomposition filters and a modification of their application. In this interpretation, the synthesis filters h2 and g2 are used systematically. If the filters are of even length, the opposite of the high-pass signal is taken to effect the spectral recomposition. In addition, if the digital signal is of even length and the indicator Ih (or Iv) is equal to 1, the over-sampling performed at the time of the spectral recomposition is adapted to insert the first zero before the first coefficient of the signal (whereas in a conventional spectral recomposition the first zero is inserted after the first coefficient).

According to the invention the decoding device also has:
  means 15 of calculating the parity of the spectral recomposition filters h2(k) and g2(k);
  means (16) of choosing the processing to be applied to the digital signal according to the parity of the spectral recomposition filters h2(k) and g2(k), the parity of the signal S and the value of the indicator Iv or Ih; and
  means 17 of applying the chosen processing to the digital signal.

This is because, as known in a spectral breakdown, when a processing A and a processing B are respectively applied to the ends of a signal before its spectral breakdown, it is necessary to apply, before its reconstruction, a processing A' and a processing B', the choice of these processings depending on the parity of the filters and the parity of the signal to be reconstructed.

The means of choosing 16 and applying 17 the processing according to the invention make it possible to reverse the end processings when the coefficients of the signal of the sub-bands have been reversed.

Two tables are given below, by way of example, for choosing the processing to be applied to the ends of the signal when, on coding, a processing of type P is chosen when the parity of the filters is odd and type 1/2P when the parity of the filters is even.

Table 3 gives the extensions of the signal for its reconstruction by the low-pass recomposition filter.

Table 4 given the extensions of the signal for its reconstruction by the high-pass recomposition filter.

TABLE 3

| Parity of filters | Parity of signal | Ih (or Iv) | extension of start of signal | extension of end of signal |
|---|---|---|---|---|
| Odd | Odd | 0 | P | P |
| Odd | Odd | 1 | P | P |
| Odd | Even | 0 | P | 1/2P |
| Odd | Even | 1 | 1/2P | P |
| Even | Odd | 0 | 1/2P | P |
| Even | Odd | 1 | P | 1/2P |
| Even | Even | 0 | 1/2P | 1/2P |
| Even | Even | 1 | 1/2P | 1/2P |

TABLE 4

| Parity of filters | Parity of signal | Ih (or Iv) | extension of start of signal | extension of end of signal |
|---|---|---|---|---|
| Odd | Odd | 0 | 1/2P | 1/2P |
| Odd | Odd | 1 | 1/2P | 1/2P |
| Odd | Even | 0 | 1/2P | P |
| Odd | Even | 1 | P | 1/2P |
| Even | Odd | 0 | −1/2P | −1/2P0 |
| Even | Odd | 1 | −1/2P0 | −1/2P |
| Even | Even | 0 | −1/2P | −1/2P |
| Even | Even | 1 | −1/2P | −1/2P |

In a preferred embodiment of the invention, the means of processing 1, breakdown 2, quantization 3 and entropic coding 4 and the recording means for the coding device are incorporated in a microprocessor 100, a read-only memory 102 containing a program for coding the digital signal, and a random access memory 103 containing registers adapted to record variables modified during the running of said program.

In a similar fashion, the means of extracting 6, applying 7 a geometric transformation, updating 8, transposing 9 and of reconstituting 10 of the transcoding device are incorporated in a microprocessor 100, a read-only memory 102 containing a program for geometrically transcoding a coded digital signal, and a random access memory 103 containing registers adapted to record variables modified during the running of the program.

Likewise, the means of reading 11, entropic decoding 12, dequantization 13, calculation 14 of the parity of the digital signal, calculation 15 of the parity of the filters, choosing 16, applying 17, transforming 18 and spectral recomposition 19 of the decoding device are incorporated in the microprocessor 100, a read-only memory 102 containing a program for decoding the coded digital signal, and a random access memory 103 containing registers adapted to record variables modified during the running of the program.

Figure 7:
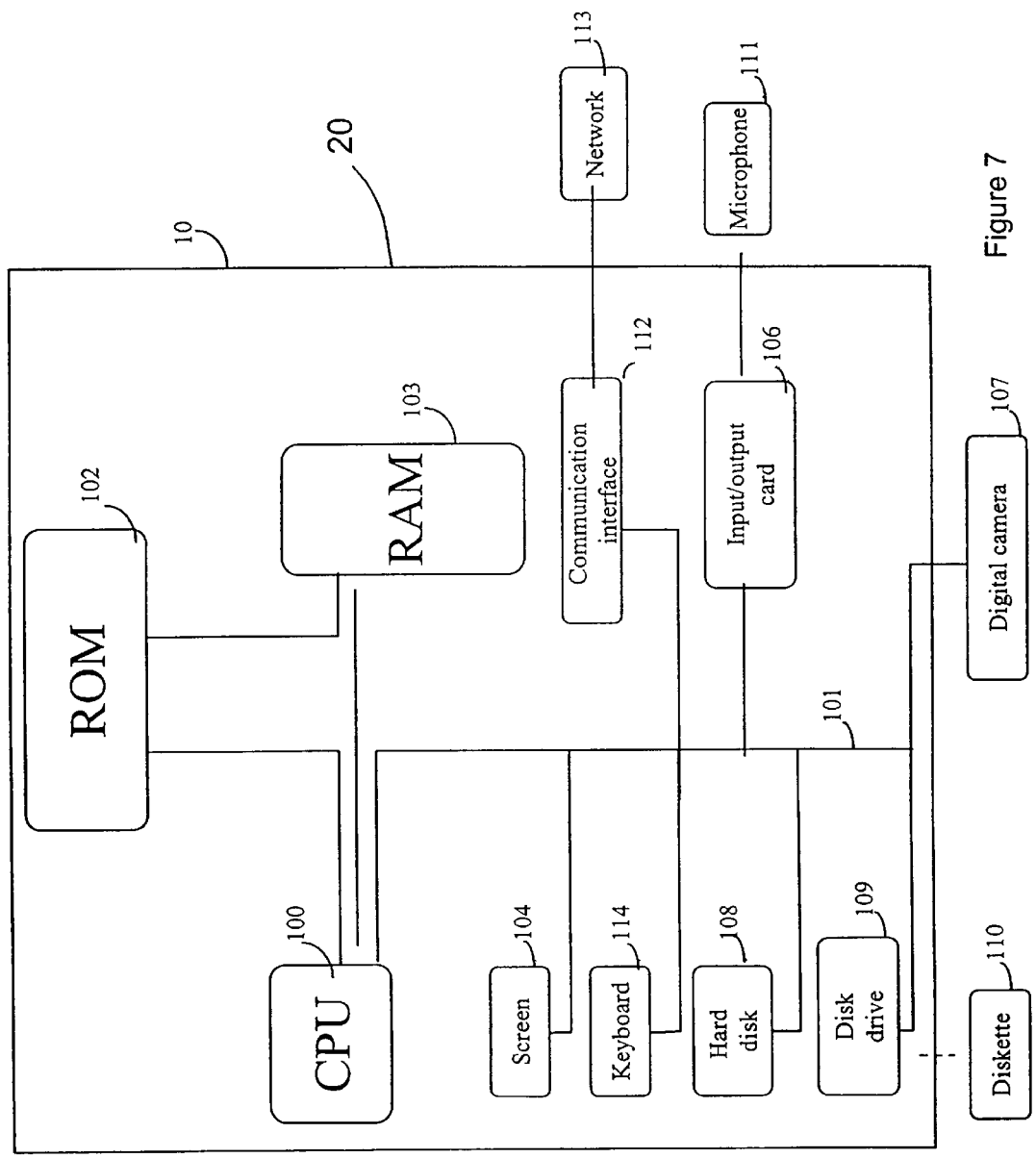
FIG. 7 depicts a device for processing a digital signal adapted to implement the coding, transcoding and decoding methods of the invention.

The microprocessor 100, the read-only memory 102 and the random access memory 103 can be integrated into a computer 20 as illustrated in FIG. 7, connected to different peripherals, for example a digital camera 107 (or a scanner, or any other image acquisition or storage means), connected to a graphics card and supplying data to be coded, transcoded or decoded according to the present invention.

The computer 20 has a communication interface 112 connected to a network 113 able to transmit digital information to be coded by the computer or to transmit compressed digital information to be transcoded or decoded by the computer. Conversely, the network 113 can transmit digital information from the computer 20.

The computer 20 also has a storage means 108 such as for example a hard disk. It also has a disk drive 109 adapted to read a diskette 110. The diskette 110 and the hard disk 108 can contain digital data to be processed according to one of the methods according to the invention, and the code of the invention which, once read by the computer 20, will be stored on the hard disk 108.

According to a variant, the program for implementing the coding, transcoding and decoding methods of the invention can be stored in a read-only memory 102. According to a second variant, this program can be received in order to be stored in a read-only memory 102 by means of the communication network 113.

The computer 20 is connected to a microphone 111 by means of an I/O card 106. The processed data will, in this case, be an audio signal of dimension 1.

The computer 20 has a screen 104 for displaying the information to be processed or to serve as an interface with the user, who will be able to parametrize certain coding, transcoding (applied geometric transformation type for example) or decoding modes, by means of the keyboard 114 or any other means (a mouse for example).

The microprocessor 100 will execute the instructions relating to the implementation of the invention, instructions stored in the read-only memory 102 or in other storage elements. On powering up, the programs and methods stored in one of the non-volatile memories are transferred into the random access memory 103, which will then contain the executable code of the invention. In a variant, the coding, transcoding and decoding methods can be stored in different places. This is because it is possible to improve the methods according to the invention by adding new methods transmitted either by the communication network 113 or by a diskette 110.

Naturally, the diskettes can be replaced by any data medium such as a CD-ROM or a memory card.

The communication bus 101 affords communication between the different elements of the computer 20 or those connected to it. The representation of the bus 101 is not limitative and notably the central unit 100 is able to communicate instructions to any sub-element of the computer 20 directly or by means of another sub-element of the computer 20.

The computer described above can contain all or part of the coding device according to the invention. It can also contain all or part of the transcoding device according to the invention. Finally, it can contain all or part of the decoding device according to the invention.

Figure 8:
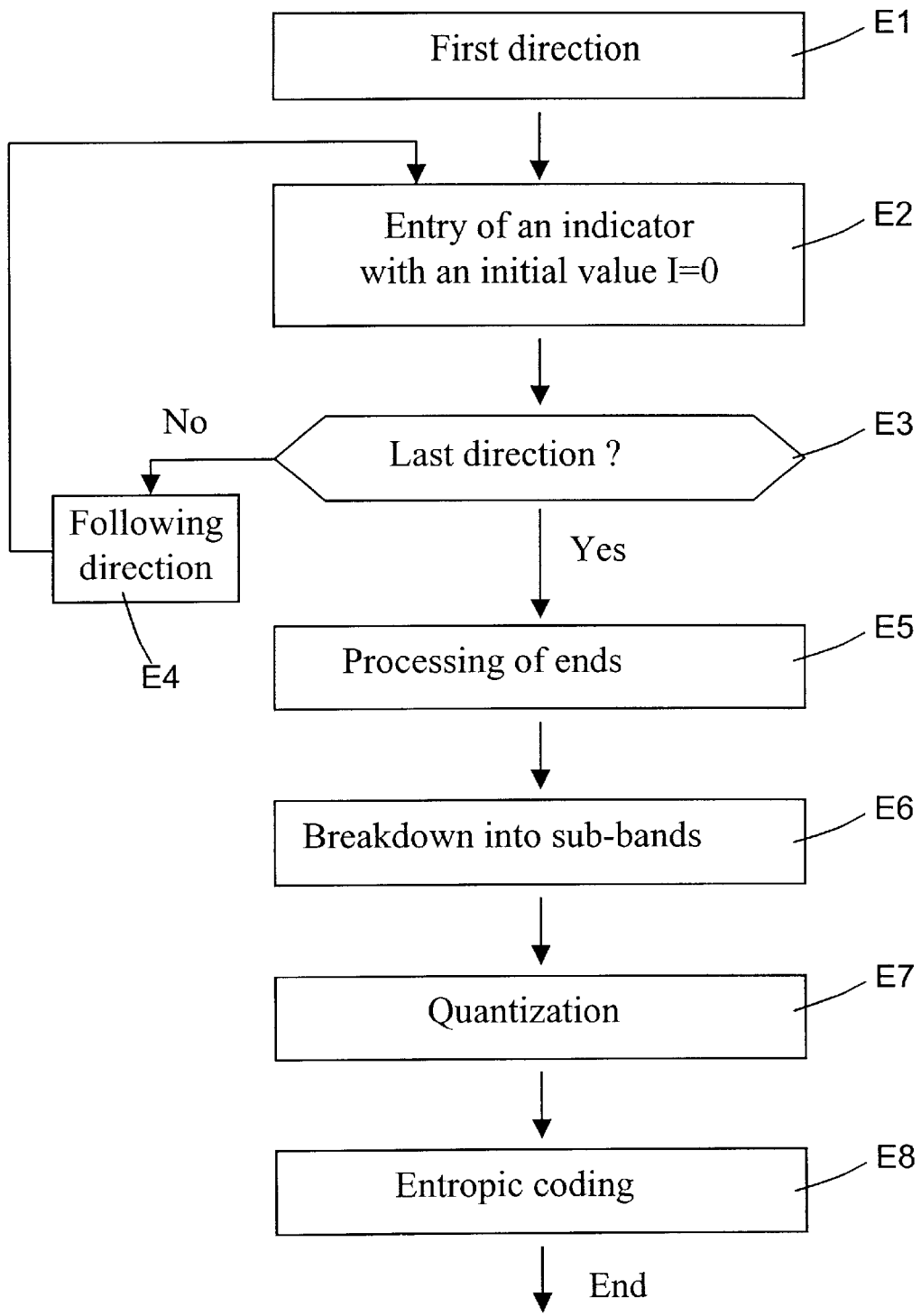
FIG. 8 is a coding signal coding algorithm according to one embodiment of the invention.

A description will now be given successively of the methods of coding, transcoding and decoding a digital signal S with reference to FIGS. 8, 9 and 10.

The coding method comprises the following steps E1 to E8:

First of all, in a step E1, the digital signal S is considered in a first direction, for example horizontal for a signal of dimension 2 representing a digital image.

According to the invention, a recording step E2 makes it possible to write, in the compressed file F comprising the coded digital signal, an indicator associated with the first direction of the digital signal. This indicator, here Ih, can be in the form of a supplementary bit having an initial value, for example 0, representing a normal order of the coefficients of the sub-band signal in this horizontal direction.

A test is next carried out, at a step E3, to determine whether all the directions of the digital signal have been envisaged.

In the negative, in a step E4, another direction of the digital signal is considered, here the vertical direction, and the step E2 of recording an indicator, here Iv, in the compressed file F, is reiterated.

The ends of the digital signal are next processed in a processing step E5, for example by means of a symmetrical extension of type P.

A step E6 of spectral breakdown into frequency sub-bands of the digital signal is next implemented in a conventional fashion and as described above, for example, at a breakdown level equal to 3.

Each sub-band $LL_3$, $LH_3$, $HL_3$, $HH_3$, $LH_2$, $HL_2$, $HH_2$, $LH_1$, $HL_1$ and $HH_1$ is then quantized in a quantization step E7 and then coded entropically in an entropic coding step E8.

The digital signal thus coded is stored in a compressed data file F with a view to its storage or transmission.

Figure 9:
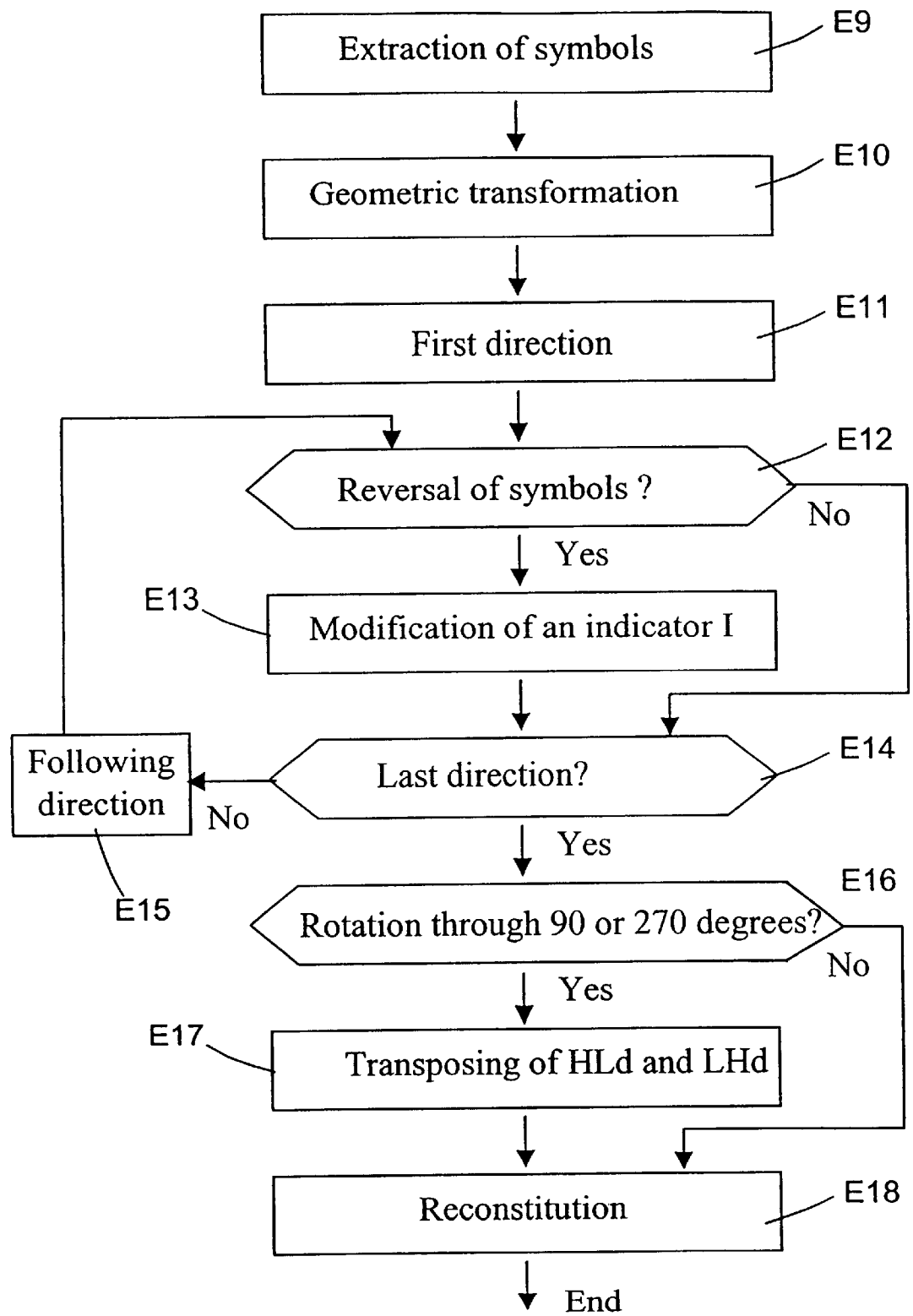
FIG. 9 is a transcoding algorithm according to one embodiment of the invention.

When a geometric transformation of the digital signal is to be applied, the compressed file F is transcoded according to the transcoding method as illustrated in FIG. 9 and which comprises the following steps:

In an extraction step E9, symbols associated with the coefficients $c_i$ of the frequency sub-bands of the digital signal are extracted.

In this example of a preferred embodiment, the extraction step E9 corresponds to an entropic decoding of the coded digital signal in order to extract the quantization symbols $q_i$ associated with each coefficient $c_i$.

Next a geometric transformation step E10 is applied to the symbols $q_i$, if applicable modifying their order in each direction of the signal. The geometric transformation applied is a transformation by axial or central symmetry of the symbols, a transformation by a rotation by a multiple of 90° or a combination of these transformations.

In addition, where the quantization step E7 includes a quantizer which varies according to a direction of the digital signal, in at least one sub-band of the digital signal, a geometric transformation identical to this quantizer is applied. For example, if the quantizer is associated with a quantization step table, the geometric transformation is applied to this quantization step table.

Next, in a step E11, a direction of the digital signal, for example horizontal, is considered.

A step E12, E13 of updating the indicator, here Ih, representing a normal or reversed order of the symbols in the horizontal direction, is next implemented.

For example, it is checked, in a test step E12, whether the direction of the symbols $q_i$ is reversed. This check can be carried out from a table such as Table 1 associating with each geometric transformation, chosen for example by a user, a value 0 or 1 representing the normal or reversed order of the symbols $q_i$ in the horizontal direction.

If the order is reversed, in a modification step E13, the value of the indicator Ih.is modified. Otherwise, the latter remains unchanged.

A test step E14 checks whether all the directions have been envisaged.

In the negative, another direction of the signal is envisaged in a step E15, here the vertical direction, and the set of steps E12 and E13 is reiterated.

It is next checked, in a test step E16, whether the geometric transformation applied comprises a rotation through 90° or 270°.

In the affirmative, the transcoding method comprises a step E17 of transposing of the frequency sub-bands $HL_3$, $HL_2$, $HL_1$ having coefficients of low frequency in a first direction of the digital signal and of high frequency in a second direction of the digital signal with respectively the frequency sub-band $LH_3$, $LH_2$, $LH_1$ of the same resolution level in the spectral breakdown, having coefficients of high frequency in this first direction and of low frequency in this second direction.

Next, in a reconstitution step E18, the complete recompression of the coded digital signal is carried out, by reversing the extraction step E9. In this embodiment, the quantization symbols $q_i$ transformed geomtrically by an entropic coding method similar to that used in the entropic coding step E8 of the coding method are therefore coded.

The transcoding method is then terminated and the transformed compressed file F* is stored or transmitted for subsequent processing.

Figure 10:
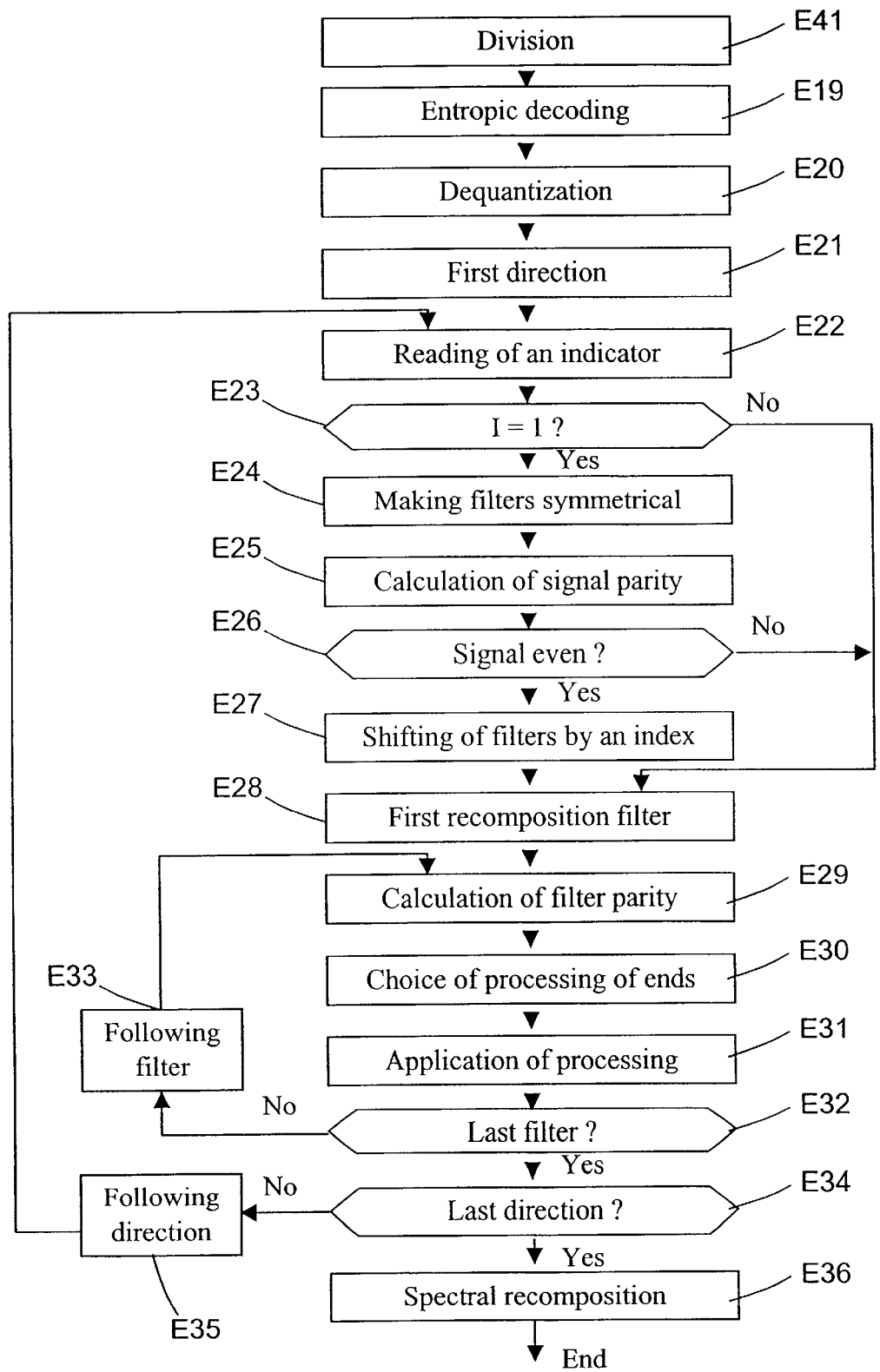
FIG. 10 is a decoding algorithm according to one embodiment of the invention.

When it is wished to extract the image from the compressed file F*, this is decoded by the decoding method according to the invention illustrated in FIG. 10.

This decoding method includes first of all, in a conventional fashion, an entropic decoding step E19, the reverse of the entropic coding step E8 of the coding method, and a dequantization step E20, the reverse of the quantization step E7 of the coding method.

A first direction of the signal is next envisaged in a step E21, for example the horizontal direction.

A reading step E22 reads the indicator Ih representing a normal or reversed state of the coefficients of the frequency sub-bands in the horizontal direction of the digital signal.

In a step E23 it is tested whether the order of the coefficients is reversed, for example by checking whether the value of Ih is equal to 1.

In the affirmative, a step E24 of making filters symmetrical, as illustrated in Table 2, is performed.

In a calculation step E25, the parity of the digital signal in the horizontal direction is calculated.

In a step E26, it is checked whether the digital signal to be reconstructed is even and, in the affirmative, still when the order of the coefficients is reversed, a shifting by an index of the spectral recomposition filters is also carried out as illustrated on the last line of Table 2.

The steps of making symmetrical E24 and shifting E27 thus correspond to a step of transforming the original spectral recomposition filters in the horizontal direction according to the parity of the digital signal or the value of the indicator Ih.

In a step E28, a first recomposition filter is next considered, for example the low-pass recomposition filter h'2 transformed as described above using the initial recomposition h'2.

Whether or not the order of the coefficients is reversed, the parity of the spectral recomposition filter h'2 is next calculated is a calculation step E29 and, in a choosing step E30, the processing to be applied to the digital signal as a function of the parity of the spectral recomposition filter, the parity of the signal and the value of the indicator Ih is chosen. This choice can be made for example using Table 3.

A step E31 of applying the chosen processing is next implemented on the digital signal to be reconstructed.

In step E32, it is tested whether all the recomposition filters have been envisaged and, in the negative, in a step E33, the following filter is considered, here the high-pass recomposition filter g'2. Steps E29 to E32 are reiterated for the processing of the ends of the digital signal, using in this case, for the choice of the symmetrical extension processing to be applied, Table 4.

Next, in a test step E34, it is checked whether all the directions of the digital signal have been envisaged and, in the negative, the following direction, here the vertical direction, is considered at step E35, so that steps E22 to E34 of the decoding method are reiterated.

The decoding method next includes a step E36 of the spectral recomposition of the digital signal by means of the transformed recomposition filters h'2 and g'2.

A digital signal S* which has undergone a geometric transformation with respect to the initial digital signal S is obtained at the output.

Figure 11:
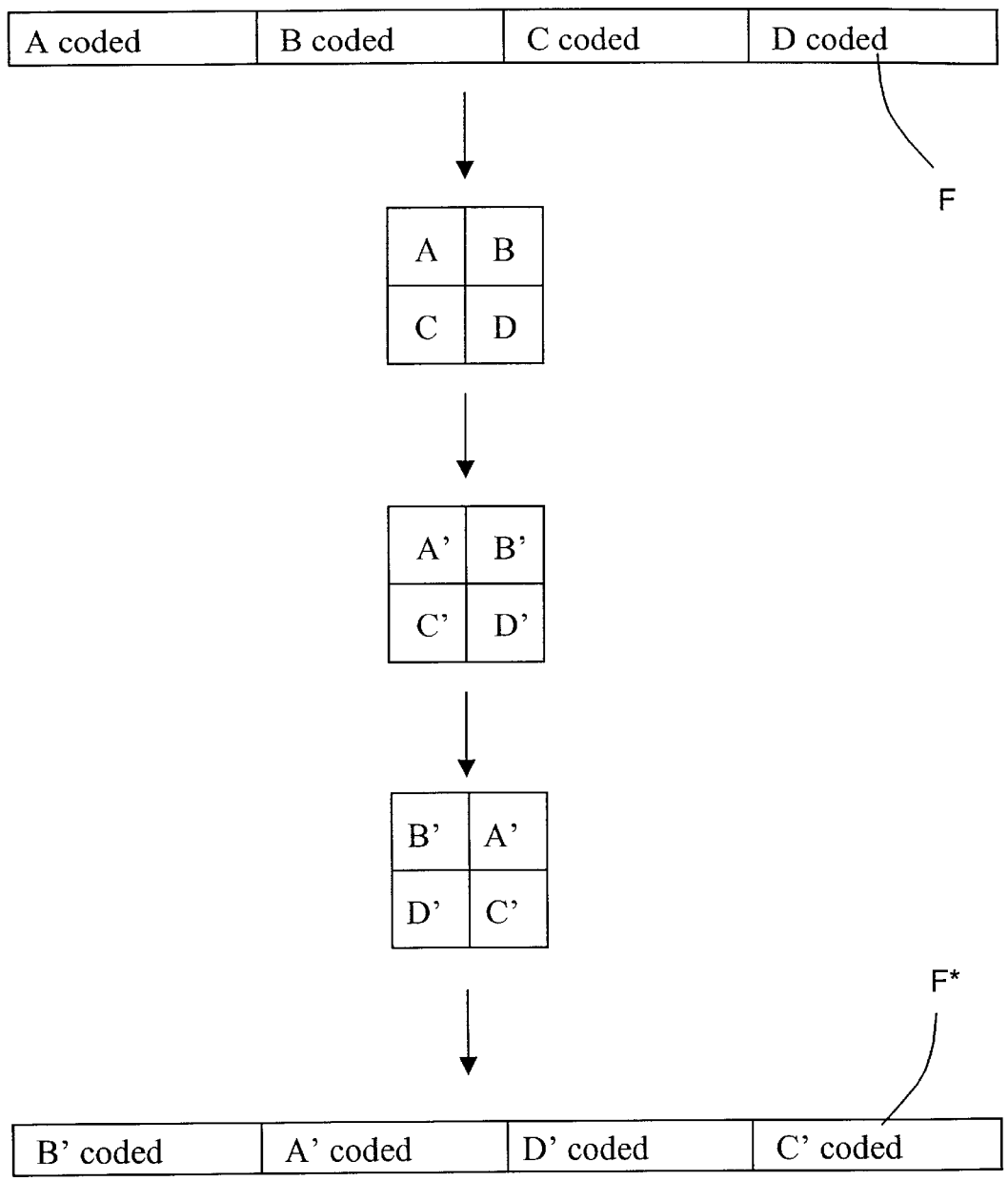
FIG. 11 illustrates schematically the transcoding method applied to several sequenced digital signals.

FIG. 11 illustrates an application of the transcoding method according to the invention to a compressed data file F containing several digital signals A, B, C, D sequenced in a predetermined order.

Such is the case notably when an initial digital signal, for example an image, is divided into signal sub-elements, each signal sub-element then being coded independently, and then stored in a predetermined order in the compressed data file to allow subsequent reconstruction of the initial digital signal.

Each subsignal A, B, C and D is transcoded separately into subsignals A', B', C' and D', these transcoded subsignals next being re-sequenced according to the geometric transformation applied. Thus the compressed data file F, containing a successive sequence of signals A, B, C and D becomes, at the end of the transcoding, a compressed data file F*, containing the successive sequence of signals B', A', D' and C'.

Figure 12:
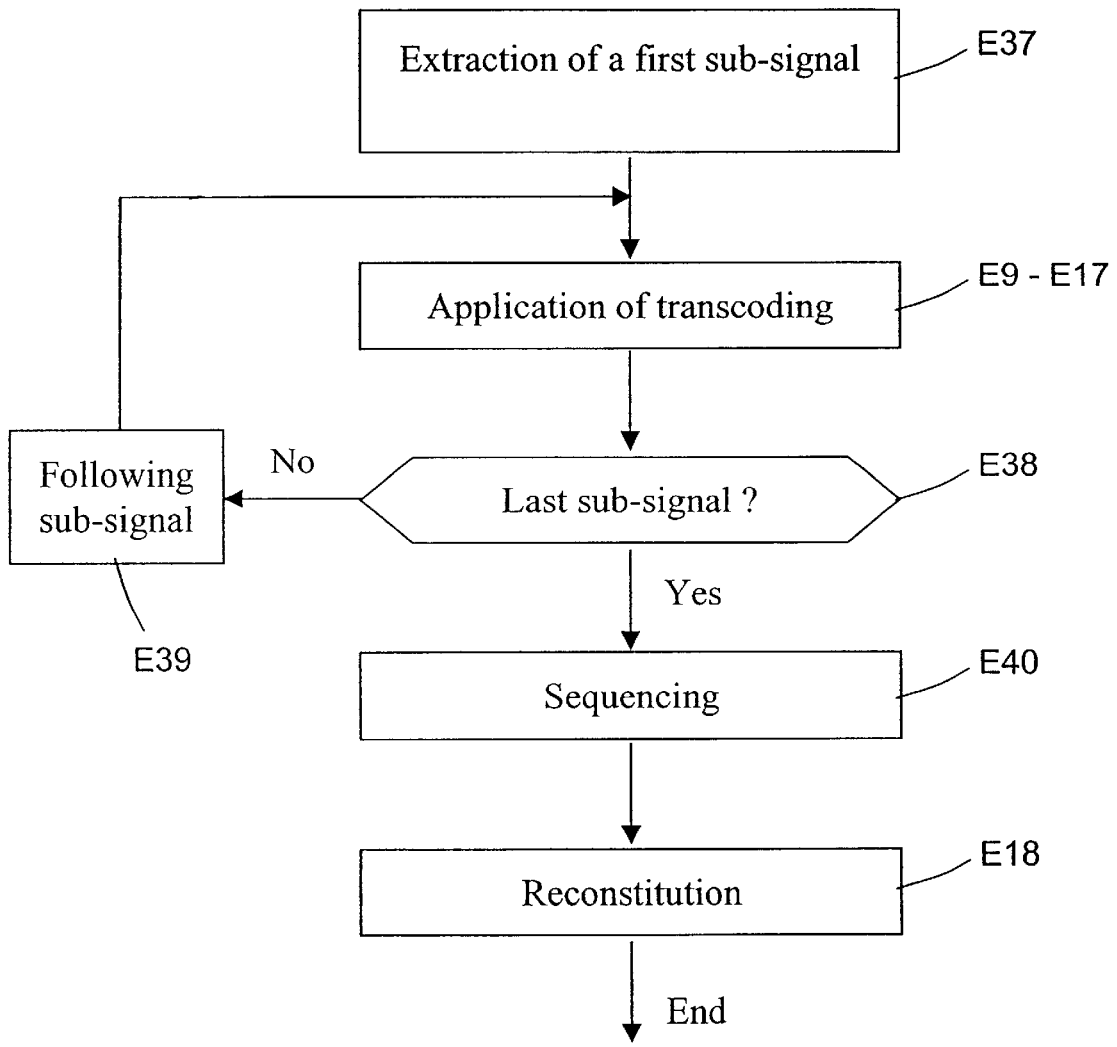
FIG. 12 is an algorithm for transcoding several sequenced digital signals.

As illustrated in FIG. 12, in this particular embodiment, the transcoding method also includes a step E40 of sequencing the digital signals A, B, C, D according to the geometrical transformation applied.

In an extraction step E37, a first subsignal is extracted from the file F, to which there are applied all the steps E9 to E17 of the transcoding method as described previously with reference to FIG. 9.

In a test step E38, it is checked whether all the subsignals have been envisaged and, in the negative, at step E39, the following subsignal is considered and the transcoding steps E9 to E17 are reiterated.

When all the subsignals have been transcoded, these subsignals are resequenced in the sequencing step E40.

The reconstitution step E18 is next implemented in order to reconstitute the compressed data file F*.

For implementing this transcoding method in this embodiment, and as illustrated in FIG. 2, the transcoding device also has sequencing means 30. These sequencing means 30 can be incorporated in a microprocessor 100 as illustrated in FIG. 7.

On decoding, and as illustrated in FIG. 10, the decoding method also includes a prior step E41 of dividing the compressed data file F* into several digital signals sequenced in a predetermined order, the size of the signal being determined according to the value of the indicators Ih, Iv.

This is because, when on decoding the initial digital signal has been divided into subsignals and this division is different at the ends of the signal, the choice of the division to be carried out in order to redivide the transcoded signal into subsignals of identical size to that of the subsignals divided on decoding is made according to the value of the indicators Ic, Iv in each direction of the signal.

In order to implement this decoding method, the decoding device illustrated in FIG. 3 also has dividing means 31. These dividing means 31 can be incorporated into a microprocessor 100 as illustrated in FIG. 7.

The present invention thus makes it possible to transform a digital signal geometrically, avoiding as far as possible the phases of decompression and recompression of the digital signal when the latter is coded by a method using a multiresolution spectral breakdown, of the wavelet type. In this way the number of calculations necessary and the memory space necessary for decompression of the signal are substantially reduced.

Thus, for example, it may be convenient, when it is wished to print a digital image, to send the latter to the printer in compressed form. The user can generally choose between "portrait" or "landscape" print modes. It suffices, by virtue of the invention, according to the mode chosen, to effect a rotation of the compressed file through 90°, and then to print.

Likewise, digital photographic appliances generally have a "diaporama" mode in which all the images are displayed one after the other on a screen, all in the same direction. However, the user takes at least two types of photograph, some with the apparatus horizontal, the others with the apparatus vertical. In effecting the diaporama, certain images will be displayed askew. The transcoding method according to the invention, associated with the coding and decoding methods, makes it possible to effect a rotation on the coded images before they are displayed.

Naturally, numerous modifications can be made to the example embodiment described above without departing from the scope of the invention.

Thus, the extraction means 6 of the transcoding device could be adapted to directly read the coded digital signal, the symbols transformed by the series being entropic codes associated respectively with the coefficients $C_i$ of the signal sub-band which are obtained by spectral breakdown. These entropic codes can be used when the entropic coding used at the time of coding of the digital signal is for example a Huffman coding.

Conversely, if the quantization signals used on coding the signal do not associate a quantization symbol $q_i$ with each coefficient $C_i$, the extraction means 6 are adapted to effect a dequantization of the coded digital signal, the symbols to which the geometric transformation is applied then being the dequantized coefficients $C_i$ of the sub-band signal obtained by spectral breakdown. Such extraction means are in particular used when the coding device uses a technique of vector quantization of the digital signal broken down into frequency sub-bands.

Although the example described concerns an image of dimension 2, the invention also applies to digital signals of dimension 1, 3 or more.

What is claimed is:

1. A method of geometric transcoding a compressed data file containing a digital signal of dimension N, wherein N is an integer, coded by means of a coding method including at least one step of spectral breakdown into frequency sub-bands of the digital signal, said method comprising the following steps:

extracting symbols associated with coefficients of the frequency sub-bands in each direction of the digital signal;

applying a geometric transformation to the symbols;

updating N indicator or indicators representing a normal or reversed order of the symbols respectively in N direction or directions of the digital signal; and reconstituting the coded digital signal by reversing said extracting step.

2. The transcoding method according to claim 1, wherein said extracting step includes reading the coded digital signal, the symbols being entropic codes associated respectively with the coefficients of the frequency sub-bands obtained by spectral breakdown.

3. The transcoding method according to claim 1, wherein said extracting step includes an entropic decoding of the coded digital signal, the symbols being symbols of quantizations associated respectively with the coefficients of the frequency sub-bands obtained by spectral breakdown.

4. The transcoding method according to claim 1, wherein said extracting step includes a dequantization of the coded digital signal, the symbols being the dequantized coefficients of the frequency sub-bands obtained by spectral breakdown.

5. The transcoding method according to claim 1, wherein the N indicator or indicators is a supplementary bit recorded in the compressed data file, having an initial value representing a normal order of the coefficients of the frequency sub-bands in a direction associated with the N indicator or indicators.

6. The transcoding method according to claim 1, the digital signal being of dimension 2, wherein the geometric transformation applied is the transformation by axial or central symmetry of the symbols, the transformation by rotation by a multiple of 90° or a combination of transformations.

7. The transcoding method according to claim 6, further comprising a step of transposing a frequency sub-band, having coefficients of low frequency in a first direction of the digital signal and of high frequency in a second direction of the digital signal with a frequency sub-band with the same resolution level in the spectral breakdown, having coefficients of high frequency in the first direction and of low frequency in the second direction when the geometric transformation applied comprises a rotation through 90° or 270°.

8. The transcoding method according to claim 1, the compressed data file containing several digital signals sequenced in a predetermined order, further comprising a step of sequencing the several digital signals according to the geometric transformation applied.

9. A method of coding a digital signal of dimension N, adapted to be transformed geometrically by the transcoding method according to claim 1, said method comprising the following steps:

spectrally breaking down the digital signal into frequency sub-bands; and recording in a compressed file the coded digital signal of N indicator or indicators associated respectively with N direction or directions of the digital signal in the form of a supplementary bit having an initial value representing a normal order of the coefficients of the frequency sub-bands in a direction associated with the N indicator or indicators.

10. A device for the geometric transcoding of a compressed data file containing a digital signal of dimension N, wherein N is an integer, coded by a coding method including at least one step of spectral breakdown into frequency sub-bands of the digital signal, said device comprising:

means for extracting symbols associated with coefficients of the frequency sub-bands in each direction of the digital signal;

means for applying a geometric transformation to the symbols;

means for updating N indicator or indicators representing a normal or reversed order of the symbols respectively in N direction or directions of the digital signal; and means for reconstituting the coded digital signal.

11. The transcoding device according to claim 10, wherein said extracting means are adapted to read the coded digital signal, the symbols being entropic codes associated respectively with the coefficients of the frequency sub-bands obtained by spectral breakdown.

12. The transcoding device according to claim 10, wherein said extracting means are adapted to perform an entropic decoding of the coded digital signal, the symbols being quantization symbols associated respectively with the coefficients of the frequency sub-bands obtained by spectral breakdown.

13. The transcoding device according to claim 10, wherein said extracting means are adapted to perform a dequantization of the coded digital signal, the symbols being the dequantized coefficients of the frequency sub-bands obtained by spectral breakdown.

14. The transcoding device according to claim 10, wherein the N indicator or indicators is a supplementary bit recorded in the compressed data file, having an initial value representing a normal order of the coefficients of the frequency sub-bands in a direction associated with the N indicator or indicators.

15. The transcoding device according to claim 10, the digital signal being of dimension 2, wherein said means of applying a geometric transformation are adapted to effect the transformation by axial or central symmetry of the symbols, the transformation by rotation through a multiple of 90° or a combination of transformations.

16. The transcoding device according to claim 15, further comprising means for transposing a frequency sub-band having coefficients of low frequency in a first direction of the digital signal and of high frequency in a second direction of the digital signal with a frequency sub-band with the same resolution level in the spectral breakdown, having coefficients of high frequency in the first direction and of low frequency in the second direction, when the geometric transformation applied comprises a rotation through 90° or 270°.

17. The transcoding device according to claim 10, the compressed data file containing several digital signals sequenced in a predetermined order, further comprising means for sequencing the several digital signals according to the geometric transformation applied.

18. The transcoding device according to claim 10, wherein said means for extracting, applying a geometric transformation, updating, reconstituting and if applicable, transposing and sequencing, are incorporated in:

a microprocessor, a read-only memory containing a program for geometrically transcoding the coded digital signal, and a random access memory containing registers, adapted to record variables modified during the running of the program.

19. A device for the geometric transcoding of a compressed data file containing a digital signal of dimension N, wherein N is an integer, coded by a coding method including at least one step of spectral breakdown into frequency sub-bands of the digital signal, said device comprising:

means for extracting symbols associated with coefficients of the frequency sub-bands in each direction of the digital signal;

means for applying a geometric transformation to the symbols;

means for updating N indicator or indicators representing a normal or reversed order of the symbols respectively in N direction or directions of the digital signal;

means for reconstituting the coded digital signal; and means for recording, in a compressed data file containing the coded digital signal, N indicator or indicators associated respectively with N direction or directions of the digital signals, in the form of a supplementary bit having an initial value representing a normal order of the coefficients of the frequency sub-bands in a direction associated with the N indicator or indicators.

20. The coding device according to claim 19, wherein said recording means are incorporated in:

a microprocessor, a read-only memory containing a program for coding the digital signal; and a random access memory containing registers, adapted to record variables modified during the running of the program.

* * * * *

UNITED STATES PATENT AND TRADEMARK OFFICE
CERTIFICATE OF CORRECTION

PATENT NO.    : 6,778,608 B1
DATED         : August 17, 2004
INVENTOR(S)   : Bertrand Berthelot et al.

It is certified that error appears in the above-identified patent and that said Letters Patent is hereby corrected as shown below:

Title page,
Item [56], References Cited, OTHER PUBLICATIONS
"Shen et al.," "Systemsk" should read -- Systems, --;
"Subband Coding of Images-Comparison With DCT", reference "XP00018364." should read -- XP000186364 --; and
"Algorithm For Manipulating Compressed Images", reference, "Aplications," should read --Applications, --.
Item [57], ABSTRACT
Line 4, "subbands" should read -- sub-bands --.

Column 1,
Line 45, "information" should read -- invention --.

Column 4,
Lines 12 and 35, "symetrical" should read -- symmetrical --;
Line 16, "he" should read -- the --;
Line 49, "steps;" should read -- steps: --.

Column 5,
Line 18, "de-coding" should read -- decoding --.

Column 6,
Line 36, "symetrical" should read -- symmetrical --.

Column 7,
Line 16, "This spatial" should read -- This breakdown circuit filters the image signal S in two directions, into sub-bands of spatial --.

Column 9,
Line 60, "dequanization" should read -- dequantization --.

Column 10,
Line 53, "over-samplying" should read -- over-sampling --.

Column 11,
Line 19, "given" should read -- gives --.

UNITED STATES PATENT AND TRADEMARK OFFICE
CERTIFICATE OF CORRECTION

PATENT NO.    : 6,778,608 B1
DATED         : August 17, 2004
INVENTOR(S)   : Bertrand Berthelot et al.

It is certified that error appears in the above-identified patent and that said Letters Patent is hereby corrected as shown below:

Column 13,
Line 43, "$q_i$associated" should read -- $q_i$ associated --.

Column 14,
Line 2, "Ih.is" should read -- Ih is --;
Line 24, "geomtrically" should read -- geometrically --; and
Line 66, "is" should read -- in --.

Signed and Sealed this

Twenty-eighth Day of June, 2005

JON W. DUDAS
*Director of the United States Patent and Trademark Office*